July 11, 1950   R. H. WRIGHT ET AL   2,515,067
VENETIAN BLIND BRACKET
Filed Dec. 27, 1948   2 Sheets-Sheet 1
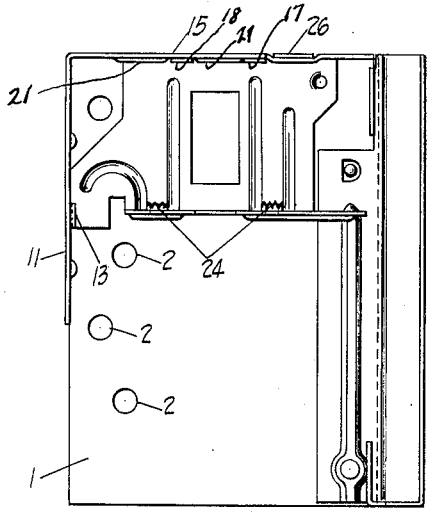
Fig. 1
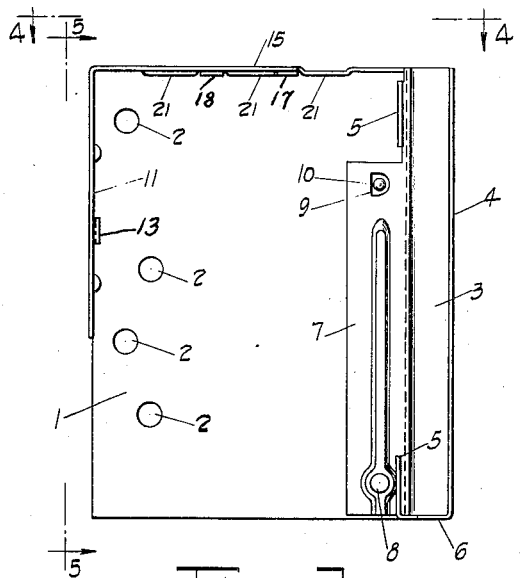
Fig. 2
Fig. 3
Fig. 4
Fig. 5
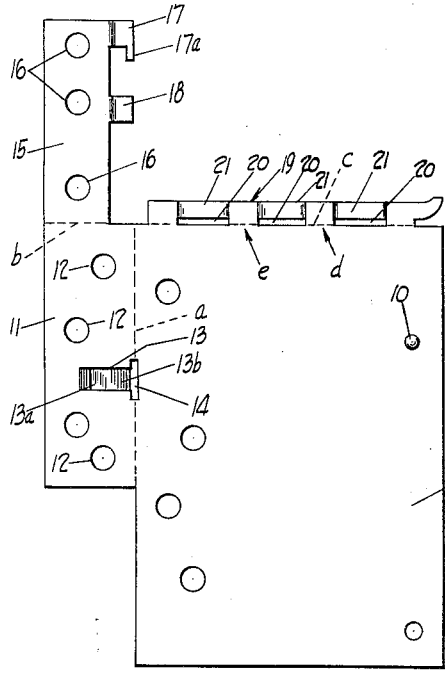
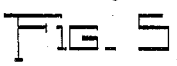
Fig. 6
INVENTORS
R. H. Wright
BY D. G. Haight
Robb & Robb
Attorneys July 11, 1950   R. H. WRIGHT ET AL   2,515,067
VENETIAN BLIND BRACKET
Filed Dec. 27, 1948   2 Sheets-Sheet 2

INVENTORS
R. H. Wright
D. G. Haight
BY
Robb & Robb
Attorneys

Patented July 11, 1950

2,515,067

UNITED STATES PATENT OFFICE 2,515,067

VENETIAN BLIND BRACKET

Richard H. Wright, Cleveland, Ohio, and Douglas G. Haight, Chicago, Ill., assignors to The Guarantee Specialty Manufacturing Company, Cleveland, Ohio, a corporation Application December 27, 1948, Serial No. 67,515

9 Claims. (Cl. 248—264)

1

This invention relates to the art of Venetian blinds and comprises primarily a novel form of bracket for supporting the blind unit upon a window or like place when the blind is in use. Generally speaking, the bracket structure of this invention is of the type employed today, the brackets being customarily made in left and right formations, and when mounted upon the window or the like, two of these brackets are utilized to support the head rail of the blind hung therefrom, provisions being made on the bracket also for supporting a facia board, if the latter is a part of the blind equipment.

An important feature of this invention lies in the versatility of the bracket structure which has been devised in that there is utilized a bracket body which is made of a single piece of sheet metal suitably formed, said body having provisions for side attachment to the window or other support on which it is to be mounted, and other unitary top and back mounting members or flanges enabling the bracket to be supported from the top or from the back thereof, dependent upon the requirements of use in respect to the manner in which the bracket is to be fitted to the window or other support on which it is to be carried.

In the carrying out of the invention, a unique feature thereof resides in the peculiar way in which the top and back mounting members or flanges are formed with the body of the bracket so that they are not only integral, but in such manner that they mutually reinforce one another in respect to their mounting or attachment to the window structure. In the latter connection the bracket of this invention distinguishes from the prior art structures wherein the top mounting members or flanges are usually separately made, required to be separately attached by welding, or riveting, or the like, to the body of the bracket, thus increasing the manufacturing cost of the article from the standpoint of the assembly thereof, as well as the actual amount of sheet metal which is employed for the combined bracket structure when completed.

Supporting brackets of the type of this invention also utilize a head bar supporting shelf member of some sort upon which the head bar of the Venetian blind is carried or supported when in use, and another feature of this invention resides in the special construction of shelf member which has been designed for the purposes of the present bracket construction in respect to providing, especially, a shelf member that is adapted to be assembled with the bracket body by a quick interlocking action for the supporting of the shelf member and a quick locking action for preventing the detachment of the shelf member from the bracket.

The present invention involves other detail features of construction of the bracket and shelf devices referred to which will appear more fully upon reference to the following detailed description in conjunction with the annexed drawings, in which:

Figure 1 is a side elevation of a Venetian blind supporting bracket embodying the invention, illustrating the head bar supporting shelf member in position as when locked to be permanently retained on the bracket, and also showing the facia clip or holder in operative position for supporting the facia board that may be carried by the bracket if such adjunct is employed in connection with the Venetian blind unit.

Figure 2 is a view similar to Figure 1 but showing the head rail shelf member omitted to bring out a little more clearly the structure of the body of the bracket in respect to the parts thereof which are interengaged by said shelf member when the latter is put in position.

Figure 3 is a plan view showing the metal blank from which the bracket body is formed after certain die punching and pressing operations have been performed upon the blank to ready the same for bending into its ultimate and final shape for use.

Figure 4 is an end view of the bracket, the head rail shelf omitted, and looking down upon the upper end of the bracket from the line 4—4 of Figure 2.

Figure 5 is a rear view of the bracket body alone, looking in the direction of the arrows from the line 5—5 of Figure 2, the facia board clip or holder also being seen in its position of Figure 2 as respects the lower portion of said clip.

Figure 6 is a perspective view of the attachable head rail shelf member with which the bracket may be combined.

Figure 7:
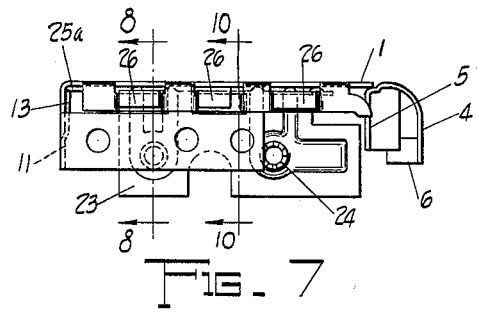
Figure 7 is a view similar to Figure 4, but illustrating the shelf member as when applied to the bracket in interlocked relation and disposed in its operative position.

The bracket means of the present invention will now be described by reference first to Figures 2 and 3 of the drawings. It will be seen that the bracket structure comprises the body 1 struck out from a piece of flat plate stock of suitable gauge, said body being formed with the openings 2 through which screws may pass so that the portion of the body at which the openings are located affords a side mounting means for the bracket such as heretofore known. The bracket 1 may be equipped, as indicated before, with a facia board clip or holder designated 3 having the outer holding flange 4 to engage the outer surface of a facia board, the spaced inner stops 5 to engage the inner surface of such board, the bottom flange means 6 to support the board at its lower edge, and the extension section 7 for facilitating pivoting of the clip at 8 to the outer portion of the bracket 1, the part 7 having the opening 9 to afford an interlock with a projection 10 on said bracket 1. Since this clip does not form any special part of the present invention, it will not be further described.

Now as seen by reference to Figure 3, and also to Figure 2, the blank of metal from which the bracket body 1 is struck is formed with an extension for providing a flange 11 having openings 12 punched therethrough, and this flange 11 is bent at right angles to the body 1 of the bracket along a line which is dotted and shown at a in Figure 3, whereby the flange 11 may provide a rear or back mounting member for the bracket 1 if the latter is to be supported at its rear edge, so to speak, on the window structure. For this purpose, of course, the openings 12 permit the passage therethrough of attachment screws which will screw into the window frame. In the forming of the blank shown in Figure 3 the black mounting flange 11 is provided with a sort of rectangular locking lug 13 which inclines from its left end 13a to its right end 13b so that the right end 13b projects from the inner face of the bracket body 1 a distance of about one-sixteenth of an inch approximately. The locking lug 13 is pressed from the metal of the blank shown in Figure 3 at a suitable stage in the production of the bracket by progressive die operations, and the slot 14 adjacent to the end 13b of the lug 13 is struck out of the metal to weaken the same, facilitating the pressure formation of the lug 13; otherwise the slot 14 has no function in the use of the present invention.

Now in addition to the back mounting flange 11 seen in Figures 2 and 3 quite clearly, the metal of the blank as seen in Figures 3 includes an extension portion for providing the top mounting flange 15. This top mounting flange is somewhat unique in its structure in that it is not only formed with the openings 16 for passage therethrough of attachment screws for top mounting of the bracket 1 upon the window structure, or the like, but said flange 15 at its inner edge is provided with a hook lug 17 and an interlocking lug 18 that are pressed outwardly from the plane of the flange 15, or in a direction opposite to that of the line of vision, viewing Figure 3. The top mounting flange 15 comprises an extension projecting from the back mounting flange 11.

Thus far there have been described the members of the bracket structure that affords the side mounting and top mounting means therefor.

Figure 11:
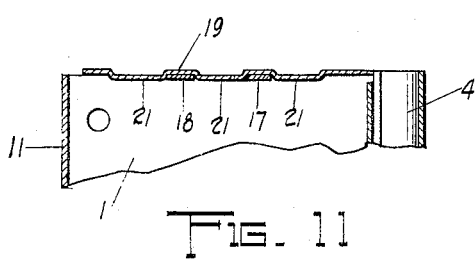
Figure 11 is a longitudinal sectional view taken about on the line 11—11 of Figure 4 and bringing out a little more clearly how the interlocking lugs on the top mounting flange cooperate with the interlocking recesses on the top attaching flange of the bracket body.

Reference is now made particularly to Figures 2, 3, and 11, and it is noted that at the top edge of the bracket body 1 there is formed an attachment flange 19 foldable at a right angle to the body 1 on the dotted line c similar to the manner in which the back mounting flange 11 is folded on the line a and the top mounting flange 15 is folded on the dotted line b, see Figure 3. In the formation of the blank of Figure 3, the sections of the attachment flange 19 that are located outwardly of the slots 20 are depressed from the plane of the flange in a direction toward the inner side of the body 1, and, as later will be seen, these depressed portions perform certain functions shortly to be described. In Figure 2 the formation of the bracket body when the parts 11, 15, and 19 have been bent to their positions in which they extend at right angles inwardly from the body 1 will be apparent.

The manner in which said parts are bent will now be set forth. Referring to Figures 2 and 3, and Figure 3 particularly, when the parts are of the formation of the blank as seen in this Figure 3, the back mounting flange 11 is bent to a position rectilinear of the bracket 1 on the line a, but previous to such bending the top mounting flange 15 will have been bent toward the inner face of the body 1 at right angles to the flange 11 along the line b. With the flange 15 projecting at right angles to the flange 11, as the latter is bent on the line a the outer edges of the hook lug 17 and the lug 18 will contact the inner face of the bracket body 1 about on the point designated by arrows d and e, in which positions they are shown in Figure 2, the characters e and d being designated on Figure 3. Next the attaching flange 19 is bent forwardly at right angles to the plate 1 or body of the bracket along a line coincident with the inner side of the slots 20. This establishes an interlock between the attachment flange 19 and the top mounting flange 15 because the lug 18 enters the slight recess adjacent to the point e in Figure 3, and the body of the hook lug 17 enters a slight recess adjacent to the point d in Figure 3, such recesses being formed by the pressing inwardly of the portions 21 of the flange 19 at points opposite the slots 20. The hook lug 17 has an extension 17a, and when the flange 19 is folded down over the lugs 17 and 18, the extension 17a of the lug 17, as seen in Figure 4, lies in the same plane as the pressed-in portion 21 at the middle of the flange 19. This establishes an interlock between the part 17a and the flange 19 for holding the top or ceiling mounting flange 15 from being pulled outwardly from the plane of the body 1 of the bracket. In addition, the fact that each of the lugs 17 and 18, as to the body portions thereof, lie in the recesses at e and d between the pressed in portions 21 affords an additional interlock between the flange 15 and the upper attachment flange 19 of the body 1, this effectively reinforcing the connection between the flange 15 and the body 1.

Figure 8:
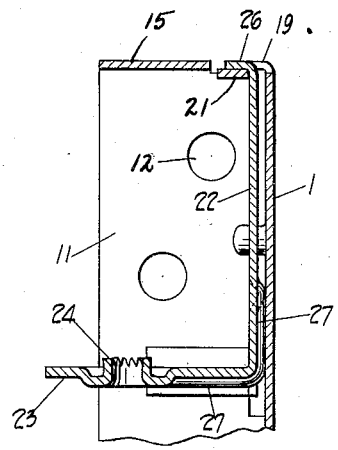
Figure 8 is a vertical sectional view, partly broken away, and taken about on the line 8—8 of Figure 7.
Figure 10:
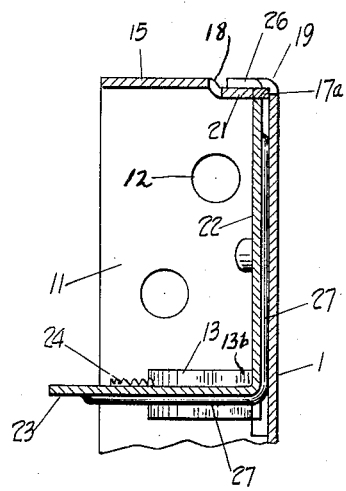
Figure 10 is a fragmentary sectional view taken on the line 10—10 of Figure 7, and is a view similar to Figure 9 but showing the head rail supporting shelf member in position as when hung on and interlocked with the bracket to prevent displacement thereof.
Figure 9:
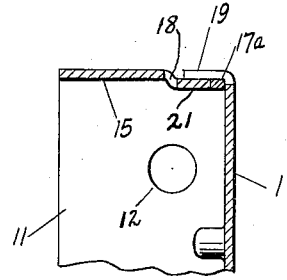
Figure 9 is a fragmentary sectional view taken about on the line 9—9 of Figure 4, bringing out more clearly the manner in which the top mounting flange is so interlocked with the top flange extending inwardly from the body as to prevent unauthorized separation between the parts.

Above is described one of the functions that may be attributed to the pressed in portions 21 of the flange 19 and shortly there will be described an additional function of the pressed in portions by reason of the fact that they form depressions in the top of the flange 19 when the latter is bent at right angles to the body 1. To bring out the secondary function of the parts 21 I next refer to Figures 1, 6, 7 and 10 of the drawings, also Figure 8, and describe the head rail shelf member that is to be used in conjunction with the mounting bracket hereinbefore set forth.

The shelf member comprises a plate 22 adapted to lie flatwise of the inner face of the bracket body 1 and formed with the outstanding horizontal head rail supporting shelf member 23. The member 23 is preferably provided with struck up small projections 24 serrated at the peripheral edges thereof to dig into the underside of the wooden head rail or bar for preventing displacement thereof from its position supported on the two shelf members of the type shown in Figure 6. At its rear edge the member 22 is formed with rearwardly extending lock arm 25, the lock edge of which is designated 25a. At its upper edge the plate 22 is formed with three hanger lugs 26 bent laterally from said edge in the same direction as the shelf member 23, the purpose of which lugs will now be shown.

With a head bar supporting member of the construction such as shown in the drawings, it is possible to quickly interengage said member with the bracket structure previously described, and to substantially simultaneously interlock the supporting member in place in a practically immovable condition. The method of accomplishing the above is shown best by reference to Figures 1 and 2. For connecting the member 22 with the bracket 1, the shelf flange 23 of the member 22 may be grasped, the plate body 22 disposed in a horizontal condition and raised to cause lugs 26 to pass upwardly through the slots 21 of the horizontally disposed attachment flange as seen in Figure 1. Then, by rocking the parts 22 and 23 bodily downwardly, the lugs 26 will engage over the flange 19 and enter the depressions formed by the pressed in parts 21 of the flange and thus lie substantially flush with the upper surface of the flange 19, as seen best in Figure 1, and Figures 8 and 10. As the members 22 and 23 are rocked downwardly, properly centered in the slots 20, the lock arm 25 rides at its edge 25a against the inner surface of the back mounting flange 11 until said edge portion 25a rides up the slope of the locking lug 13 on the flange 11 and reaches a point at the inner end or high end of the lug 13, whereupon said edge 25a of the arm 25 springs into the space between the bracket body 1 and the inner high end of the lug 13 and becomes locked in such position. Once the head bar supporting member of Figure 6 is so mounted on the bracket 1, it will become permanently attached thereto and ordinarily permanently used therewith. It may, however, be removed by exerting sufficient force on the plate 22 to shift the same in a planar direction away from the flange 11 to enable the edge portion 25a to escape from under the lug or projection 13, whereupon the supporting member 22 may be removed from the bracket 1.

It will be seen from the foregoing that by reason of the method of mounting the shelf member on the bracket 1, it is entirely unnecessary to weld the said member to the bracket, rivet it, or use any other fastening means except the interlock means 13 and 25 described, so that quick assembly of the parts is permitted, this reducing the cost of assembly of the units of the invention.

Obviously, when the shelf member 22, 23 is mounted in the position of Figures 1, 7, 8, and 10, it actually constitutes a rigid bracing and reinforcing for the top mounting flange 15 and the side mounting flange 11, which themselves mutually reinforce one another as respects their connection with the body 1 of the bracket unit. The manner in which the attachment flange 19 overlies the extension 17a of the lug 17, as well as the manner in which the hanger lugs 26 overlie the attachment flange 19 is well illustrated in Figure 10 wherein the head bar or rail supporting shelf member is seen in its operative locked position. The portions 22 and 23 of the supporting shelf member may be corrugated, as shown at 27, for the purpose of rigidifying the plate-like structure.

In regular order of operation, the mode of assembling the parts as shown in Figure 1 involves a bracket construction in which the ceiling mounting flange 15 is bent downwardly on the line b at right angles to the flange 11, the flange 11 is then bent at right angles to the body 1 to juxtapose the lugs 17 and 18 against the inner face of the bracket body 1, the attachment flange 19 is then bent downward over the lugs 17 and 18, and finally the shelf member 22—23 is interhooked at 26 with the flange 19 and rocked downwardly to interengage the arm 25 with the locking lug 13, thereby completing the entire assembly. Of course, the bracket structure such as shown in Figure 2 will be completed first, the shelf unit of Figure 6 stamped out and completed by itself, and then the two main units, the bracket structure and the shelf unit, assembled as a final operation.

Having thus described our invention, what we claim as new and desire to secure by Letters Patent of the United States, is:

1. In a Venetian blind supporting bracket, a body member having a lateral back mounting first flange off-standing from one edge near an end thereof, an extension projecting from said flange and forming a top mounting second flange bent at a right angle to the first flange and disposed at a right angle to the body member, and mutually cooperable interlocking parts on the second flange and the body member interlockingly connecting the same together.

2. In a Venetian blind supporting bracket, a body member having a lateral back mounting first flange off-standing from one edge near an end thereof, an extension projecting from said flange and forming a top mounting second flange bent at a right angle to the first flange and disposed at a right angle to the body member, the inner edge portion of the second flange having lock parts interlockingly connected to the adjacent end of the body member, in which said end of the body member being bent to form an attachment flange engaged by the lock parts of the second flange member.

3. In a Venetian blind supporting bracket, a body member having a lateral back mounting first flange off-standing from one edge near an end thereof, an extension projecting from said flange and forming a top mounting second flange bent at a right angle to the first flange and disposed at a right angle to the body member, the inner edge portion of the second flange having lock parts interlockingly connected to the adjacent end of the body member, said end of the body member being bent to form an attachment flange engaged by the lock parts of the second flange member, the said attachment flange being formed with slots, combined with a head rail mounting support having hooks engaging in said slots by which the support is suspended on the body member of the bracket.

4. In a Venetian blind supporting bracket, a body member having a lateral back mounting first flange off-standing from one edge near an end thereof, an extension projecting from said flange and forming a top mounting second flange bent at a right angle to the first flange and disposed at a right angle to the body member, the inner edge portion of the second flange having lock parts interlockingly connected to the adjacent end of the body member, said end of the body member being bent to form an attachment flange engaged by the lock parts of the second flange member, the said attachment flange being formed with slots, combined with a head rail mounting support having hooks engaging in said slots by which the support is suspended on the body member of the bracket, the rail support including a hanger plate having said hooks, and a shelf offstanding from the hanger plate to directly carry a head rail.

5. In a Venetian blind supporting bracket, a body member formed with a back mounting flange at a rear edge thereof projecting laterally therefrom, a head rail supporting member comprising a hanger plate hung from the upper edge of the body member and swingable to lie flat against an adjacent side of the body member, and a projection on the said flange to engage and hold the hanger plate against displacement from the body member.

6. A bracket unit as claimed in claim 6, in which the hanger plate has means at its upper end to interlockingly hang the said plate on the body member to hold said plate against vertical movement when flat against the body member, and said projection being spaced at one end from the body member to receive a portion of the plate between it and the body member so the supporting member cannot be accidentally displaced.

7. As an article of manufacture, a bracket unit comprising a flat metal body member having at a corner thereof a first mounting flange bent off a side edge thereof, said flange having a second integral mounting flange extending along another edge of the body member at a right angle to the member, and mutually cooperable interlocking parts on second flange and the body member interlockingly connecting the same together.

8. As an article of manufacture, a bracket unit comprising a flat metal body member having at a corner thereof a first mounting flange bent off a side edge thereof, said flange having a second integral mounting flange extending along another edge of the body member at a right angle to the member, and means to attach the inner edge of the second flange to the adjacent edge portion of the body member, comprising an attachment flange bent off said adjacent edge of the body member, said attachment flange and the said second flange having parts interlocking them together against movement in a plurality of directions.

9. In a Venetian blind supporting bracket, a body member having a lateral back mounting first flange off-standing from one edge near an end thereof, an extension projecting from said flange and forming a top mounting second flange bent at a right angle to the first flange and disposed at a right angle to the body member, the inner edge portion of the second flange having lock parts interlockingly connected to the adjacent end of the body member, said end of the body member being bent to form an attachment flange engaged by the lock parts of the second flange member, the said attachment flange being formed with slots, combined with a head rail mounting support having hooks engaging in said slots by which the support is suspended on the body member of the bracket, the rail support including a hanger plate having said hooks, and a shelf offstanding from the hanger plate to directly carry a head rail, and a projection on the second flange to engage and hold the hanger plate against displacement from the body member.

RICHARD H. WRIGHT.
DOUGLAS G. HAIGHT.

REFERENCES CITED

The following references are of record in the file of this patent:

UNITED STATES PATENTS

| Number | Name | Date |
|---|---|---|
| 2,027,280 | Lindemann | Jan. 7, 1936 |
| 2,138,502 | Nordstrom et al. | Nov. 29, 1938 |
| 2,267,160 | McKerlie | Dec. 23, 1941 |